United States Patent
Daimer et al.

(10) Patent No.: US 6,834,072 B2
(45) Date of Patent: Dec. 21, 2004

(54) METHOD, FURNACE SHELL, AND FURNACE FOR REBAKING AND GRAPHITIZING CARBON BODIES

(75) Inventors: Johann Daimer, Mörfelden-Walldorf (DE); Stefan Gschwandtner, Aigen-Voglhub (AT); Franz Kalchschmid, Hallstatt (AT); Franz Kals, Steeg (AT); Walter Lhotzky, Steeg (AT); Franz Liebhart, Bad Goisern (AT); Gerhard Putz, Bad Goisern (AT); Hubert Putz, Bad Goisern (AT)

(73) Assignee: SGL Carbon GmbH & Co., Steeg/Hallstaetter See (AT)

( * ) Notice: Subject to any disclaimer, the term of this patent is extended or adjusted under 35 U.S.C. 154(b) by 0 days.

(21) Appl. No.: 10/414,835

(22) Filed: Apr. 16, 2003

(65) Prior Publication Data

US 2003/0235232 A1 Dec. 25, 2003

(30) Foreign Application Priority Data

Apr. 16, 2002 (AT) ........................................ A 583/2002

(51) Int. Cl.$^7$ ............................................... F27D 7/06
(52) U.S. Cl. ...................................... 373/110; 373/137
(58) Field of Search .............................. 373/1, 2, 3, 9, 373/109, 110, 111, 112–114, 117, 118, 120, 127–130, 137; 432/137, 145; 423/448; 264/29.3; 106/236, 274

(56) References Cited

U.S. PATENT DOCUMENTS

| | | | | |
|---|---|---|---|---|
| 1,029,121 A | * | 6/1912 | Heroult | 373/114 |
| 4,015,068 A | | 3/1977 | Vohler | |
| 4,128,394 A | * | 12/1978 | Naito et al. | 432/137 |
| 4,190,637 A | * | 2/1980 | Kennedy | 423/448 |
| 4,639,930 A | * | 1/1987 | Kandzia | 373/120 |
| 4,847,021 A | * | 7/1989 | Montgomery et al. | 264/29.6 |
| 5,299,225 A | | 3/1994 | Karagoz et al. | |
| 5,501,729 A | * | 3/1996 | Lewis et al. | 106/274 |

FOREIGN PATENT DOCUMENTS

| | | |
|---|---|---|
| DE | 2 224 905 | 6/1974 |
| DE | 24 57 923 A1 | 6/1976 |
| WO | 87/06685 | 11/1987 |

OTHER PUBLICATIONS

"Ullmann's Encyclopedia of Industrial Chemistry", *VCH Verlag, Weinheim*, 5$^{th}$ ed., 1986, pp. 103–113.

* cited by examiner

Primary Examiner—Tu Hoang
(74) Attorney, Agent, or Firm—Laurence A. Greenberg; Werner H. Stemer; Ralph E. Locher

(57) ABSTRACT

A method rebakes and graphitizes pitch-impregnated carbon bodies in an encapsulated Castner-type lengthwise graphitization furnace in one step. A furnace shell is constructed of element modules and can carry out the method. A furnace utilizes the furnace shell. The oxygen content in the interior of the furnace is kept below 4% by volume. The method is carried out under atmospheric pressure or at pressures that differ only slightly from the atmospheric pressure.

10 Claims, 4 Drawing Sheets

METHOD, FURNACE SHELL, AND FURNACE FOR REBAKING AND GRAPHITIZING CARBON BODIES

BACKGROUND OF THE INVENTION

Field of the Invention

The invention relates to a method for rebaking and graphitizing pitch-impregnated carbon bodies in one method step. The invention also relates to a furnace shell that is suitable for the afore-mentioned method, can be sealed off in a largely gas-tight manner and is of a Castner-type lengthwise graphitization furnace for carrying out the afore-mentioned method. Furthermore, the invention relates to a furnace including the furnace shell.

The production of graphitized carbon bodies is a technique that has been mastered up to now for over one hundred years and is applied on a large scale industrially and has therefore been refined in many respects and optimized with regard to costs. One of the descriptions of this technique can be found in *Ullmann's Encyclopedia of Industrial Chemistry*, Vol. A5, published by VCH Verlagsgesellschaft mbH, Weinheim, 1986, pages 103 to 113.

A striking feature of this technique is the repeated reimpregnation and rebaking of carbon bodies. These method steps are necessary, because the graphitized carbon bodies must have a minimum density, strength and conductivity in order to meet the requirements with respect to the application of the graphitized carbon bodies. These method steps are associated with costly handling of the carbon bodies, that is, the carbon bodies must be repeatedly inserted into impregnating autoclaves, removed, inserted into carbonization furnaces and removed again.

There has not been any lack of attempts, therefore, to combine the method steps, to allow one or more of these method steps to be omitted. Typically, these attempts employ changed raw materials, changed recipes for the raw-material mixtures, or optimized techniques for "green production".

Another attempt to manage with fewer method steps involved combining the last rebaking step with the final graphitization step. Trials with furnaces such as those sold under the tradename ACHESON from the past few decades are known. This so-called "transverse graphitization" is less economical than the "lengthwise graphitization" widespread today, in which the carbon bodies are disposed in the furnaces in such a way that the electric current flows directly through the carbon bodies parallel to their longitudinal axis. Reimpregnated carbon bodies were thus installed in transverse graphitization furnaces and then attempts were made to achieve rebaking and graphitization in one method step or in one furnace campaign or life with just one step of installing the reimpregnated carbon bodies and one of removing the then graphitized carbon bodies.

By the term "furnace life", also when used further below, what is to be understood is as follows: reimpregnated or non-impregnated carbon bodies are inserted into a graphitization furnace and surrounded with a thermally insulating packing, preferably made of coke. By passing direct current passage through the packing and through the carbon bodies, the latter are heated, with the heating ranging from ambient temperature to the graphitization temperature (up to 3000° C.) using a predetermined temperature-time-program. The peak temperature can be maintained for a short period of time. Following this, the current is switched off and with that the whole furnace cools, something that, depending on the total mass of the carbon bodies, the packing, and the furnace components, can take up several days.

A lengthwise graphitization furnace in which the carbon electrodes are graphitized as a column without a surrounding insulating packing is described in German published, not prosecuted patent application No. DE 24 57 923. In this respect, this furnace is not a Castner-type lengthwise graphitization furnace. So that the electrodes are not attacked by the oxygen in the air during the thermal treatment, the electrode column is surrounded by water-cooled, bowl-shaped walls that are lined on the inside with graphite felt, and the hollow space between the electrode column and the walls is flushed with protective gas. The teaching of this specification does not specify that (re-)impregnated carbon bodies are inserted into the furnace; on the contrary, there is discussion of "carbon bodies", see page 6, first paragraph, 4th and 9th line and also 3rd paragraph, 1st line, that is, of baked carbon that emits very little low-temperature carbonization gas or cracked gas during the thermal treatment. The rebaking and graphitization in one method step is not taught for this specific type of furnace.

U.S. Pat. No. 5,299,225 to Karagoz et al. provides teaching regarding a Heroult or Castner-type lengthwise graphitization furnace in which a column of carbon electrodes are surrounded by an insulating packing of coke grains during the thermal treatment. The column of carbon electrodes and the surrounding insulating packing of coke grains, according to the teaching of this specification, are located in a relatively gas-tight furnace shell made from metallic and ceramic components, see column 2, lines 40 to 45, and covered by a hood. By using this device, it is possible for low-temperature carbonization or cracked gases that develop during the thermal treatment to be collected and disposed of easily. In this specification, however, it is not taught that the rebaking and graphitization are carried out in one method step.

A method for combining the step of rebaking and graphitization is described in German Patent Application No. DE 22 24 905. According to this, the carbon bodies that are orientated transversely in relation to the current flow are installed in the furnace in a plurality of layers one above the other. The lower layers include carbon bodies that are reimpregnated with pitch and the upper layers include non-impregnated carbon bodies. In this way, on the one hand, the quantity of pitch introduced into the furnace was reduced. On the other hand, this configuration of the carbon bodies favorably influences the temperature distribution in the furnace during the furnace life. A higher temperature namely set in the upper portion of the furnace, which temperature effected further decomposition of the problematic cracked gases that developed from the pitch in the lower portion of the furnace to give less problematic gases. This method has not been executed to success in practice and in the end has failed with respect to the resultant cracked gases. The following explains the result.

Baked carbon bodies have a considerable porosity of the order of magnitude of 20 to 25% by volume after the initial baking. The pores are filled with pitch during (re-)impregnation. If (re-)impregnated carbon bodies are installed in a furnace such as those sold under the tradename ACHESON in comparatively large quantities of, for example, some ten tons, a few tons of impregnating pitch is also introduced into the furnace. When the (re-)impregnated carbon bodies are heated, the pitch first becomes soft and then liquid until it decomposes given further rising temperatures. From the impregnating pitch there develop solid carbon (coke) and volatile cracked gases which are composed of an extraordinarily broad spectrum of hydrocarbon compounds, starting with high-molecular tars and oils and ending with low-molecular compounds, such as $CH_4$ or CO. At low heating rates, small volumes of volatile cracked gases develop from the impregnating pitch per unit of time; at high heating rates, large volumes develop.

Very high final temperatures of, for example, 3000° C. are achieved in comparatively short periods of time of, for example, 15 to 25 hours, that means, high heating rates are achieved, in graphitization furnaces. In comparison, final temperatures of, for example, 1000° C. are achieved in comparatively long periods of time of, for example, seven days in carbonization furnaces. The high heating rate unfavorably causes development of extraordinarily large quantities of volatile cracked gases from the impregnating pitch. The graphitization system, the surrounding building, and the environment are loaded to excess by these undesirable gases; production according to this method is not therefore expedient.

SUMMARY OF THE INVENTION

It is accordingly an object of the invention to provide a method, a furnace shell, and a furnace for rebaking and graphitizing carbon bodies that overcome the hereinaforementioned disadvantages of the heretofore-known devices of this general type and that combine the method steps of rebaking and graphitization in one method step when producing graphitized carbon bodies and to provide a suitable, modern and economically operating graphitization furnace therefor. A further object is to construct the important units of the furnace, such as the furnace ends, shell and covering, in such a gas-tight manner that a change in gas pressure in the furnace can be permanently maintained in the range of +10 Pa to −40 Pa in relation to the surrounding air pressure.

Such a system and use thereof, on the one hand, allows, instead of running through two separate method steps (in the first instance rebaking and then graphitization), the carbon bodies to only run through one furnace life; this requires less handling of the whole tonnage of graphitized carbon bodies that is produced. On the other hand, the sealed rebaking and graphitization furnace collects the cracked gases that develop from the impregnating pitch and the environment is not loaded to an inadmissible extent.

With the foregoing and other objects in view, there is provided, in accordance with the invention, a method for rebaking and graphitizing carbon bodies impregnated with pitch in one method step. The first step of the method is installing the carbon bodies in a Castner-type lengthwise graphitization furnace having a shell and current-supplying and current-returning electrodes. The next step is forming a column by aligning the carbon bodies between the current-supplying and current-returning electrodes. The next step is surrounding the impregnated carbon bodies on all sides by a thermal insulating layer of coke packing material. The next step is enclosing the thermal insulating layer embracing the carbon bodies within the surface by closing a largely gas-tight covering on the shell in a gas-tight manner and thereby defining a furnace atmosphere and an external air pressure surrounding the furnace. The next step is, before heating the carbon bodies, lowering an oxygen content in the furnace atmosphere to less than 4% by volume. The next step is conducting an electrical current through the column of the carbon bodies according to a predetermined program to heat the column of the carbon bodies in one furnace campaign or life through a rebaking stage of the impregnating pitch to reach ultimately a graphitization temperature. The next step is regulating a gas pressure inside the graphitization furnace to limit deviation between +10 Pa and −40 Pa relative to the external air pressure by at least in part removing gases and vapors escaping the carbon bodies and the insulating layer from the furnace with a suction device. The next step is interrupting the electrical current after the graphitization temperature has been reached. The final step is removing the now rebaked and graphitized carbon bodies after cooling the insulating packing until the gases and vapors cease to emerge therefrom and then opening the furnace.

With the objects of the invention in view, there is also provided a furnace shell sealable in a largely gas-tight manner and usable in a Castner-type lengthwise graphitization furnace. The shell includes two furnace ends, a steel-sheet element, a concrete rib, a carrier, compensators, and mineral wool. The two furnace ends delimit an interior space, are made of ceramic material, are largely gas-tight per se, have electrodes for conducting an electrical current, and define a longitudinal axis therebetween. The steel-sheet element and the concrete rib connect together and to the furnace ends in a detachable, but largely gas-tight manner and following each other alternatingly. The steel-sheet element has shell walls and a broad, largely planar shell base that connect the shell walls; together they define an inside contour. The steel-sheet element is disposed longitudinally and defines two longitudinal ends. The carrier is disposed on the lower side of the shell base and rests on a hall floor. A respective compensator is made from corrugated sheet steel and connected in a gas-tight and fixed manner at each of the longitudinal ends of the steel-sheet element. The heat-resistant and electrically insulating concrete rib stands on the hall floor and has an inside contour matching the inside contour of the steel-sheet shells. The steel-sheet elements and the concrete ribs have an upper edge facing the covering hood and have a groove formed therein for receiving a covering hood. The mineral wool fills the groove and is compressible by the covering hood when lower edges of the covering hood engage the grooves to create a sufficiently gas-tight seal.

With the objects of the invention in view, there is also provided a lengthwise graphitization furnace including a furnace shell as described above and a covering hood. The covering hood has a lower edge for resting on the upper shell edge in a sealed yet removable manner. The covering hood seals off an interior space when resting on the upper shell edge.

The process temperatures demand that, for example, carbonization furnaces should not be used for the combination of the two method steps, rebaking and graphitization, because these furnaces would not withstand the high temperatures during the graphitization. Instead, graphitization furnaces should be used in which the carbonization temperatures only represent an intermediate stage before the graphitization temperatures are reached. It was explained in a corresponding manner with respect to the prior art that attempts have been made to achieve rebaking and graphitization in a furnace such as those sold under the tradename ACHESON and methods have been described regarding this. For the solution to the present object, a modern and economically operating Castner-type graphitization furnace was selected instead of the Acheson-type graphitization furnace. With a furnace of such a kind, rebaking and graphitization were realized in one method step or in one furnace life.

Castner-type lengthwise graphitization furnaces have two furnace ends and an extended furnace bed that lies in between. The bed is made of a coke packing. The carbon bodies that are to be graphitized are disposed on the bed. In turn, the bodies are covered with a coke packing for the purposes of insulation. Given such an open pile-like configuration, it is impossible to regulate the pressure and composition of the atmosphere above this open Castner-type system. Regulation of the furnace atmosphere is only successful if the furnace is largely sealed. In accordance with the invention, the Castner-type graphitization furnace is so gas-tight that a change in gas pressure in the furnace can be permanently maintained in the range of +10 Pa to −40 Pa in relation to the surrounding air pressure.

In accordance with the invention, the Castner-type graphitization furnace has such a gas-tight shell formed from joined, ceramic, concrete-like or metallic materials, or a combination of these materials, including the covering, that a change in gas pressure in the furnace can be permanently maintained in the range of +10 Pa to −40 Pa in relation to the surrounding air pressure.

The considerable changes in temperature in the furnace after many furnace lives give rise to cracks or distortions in the shell if the latter is made of ceramic brickwork. Such cracked or distorted shells can only be returned to a largely gas-tight condition with difficulty. It would be necessary to re-build the furnace with a tight shell.

In the literature, shells for graphitization furnaces are described that only include metallic, preferably steel-sheet elements. However, as presented in the case of International PCT Publication WO 87/06685, these do not have the object of providing a largely gas-tight container for the graphitization process, but instead the whole furnace bed is to be conveyable without effort. In the case of such "normal" graphitization furnaces, it is also not the object to remove comparatively large quantities of cracked gases, because the carbon bodies are inserted into the furnace in the carbonized, non-impregnated state.

In contrast with the system according to International PCT Publication WO 87/06685, a combination of concrete elements and metallic elements provide the solution in accordance with the invention to the object that is set here. The Castner-type graphitization furnace contains a gas-tight shell in accordance with the invention. The gas-tight shell is made of assemblies disposed along the length of the graphitization furnace. The assemblies include, in each case, a steel-sheet element, a steel-sheet compensator, and an electrically insulating concrete rib. A change in gas pressure in the furnace can be permanently maintained in the range of +10 Pa to −40 Pa in relation to the surrounding air pressure.

The cracked gases that develop in a hot graphitization furnace emerge on all sides from a pile-like construction of the furnace, leaving aside the tight end faces of the furnace ends in which the electrical contacting with the carbon bodies in the furnace is also located. If the graphitization furnace is now equipped in accordance with the invention with a shell that is gas-tight in the manner described, the cracked gases can only emerge upwards. In order to prevent the cracked gases from escaping into the environment, the Castner-type graphitization furnace in accordance with the invention has such a gas-tight, heat-insulated steel-sheet covering that a change in gas pressure in the furnace can be permanently maintained in the range of +10 Pa to −40 Pa in relation to the surrounding air pressure. The heat-insulated steel-sheet covering permits developing cracked gases from the impregnated carbon bodies to be collected and removed at a gas pressure in the furnace in the range of +10 Pa to −40 Pa.

During the heating phase, current flows through the carbon bodies in a Castner-type graphitization furnace. On account of the electrically conductive connection with the coke packing that surrounds the carbon bodies, current will inevitably flow through this packing as well in accordance with its respective electrical resistance. Current would also flow through the furnace shell, which includes the steel-sheet elements and pertains to the furnace in accordance with the invention, to an inadmissibly high extent if electrically insulating concrete ribs were not disposed between the steel-sheet elements and the steel-sheet compensators. The same considerations naturally also apply to the steel-sheet covering for the whole furnace. It too must be electrically insulated in relation to the coke packing and the steel-sheet elements with the steel-sheet compensators. This is achieved in that the Castner-type graphitization furnace has a covering, sitting on the upper shell edge, and a shell that are electrically insulated in respect of each other with the aid of mineral wool for one respective furnace life. At the same time, the mineral wool has the effect of sealing the shell and the covering in relation to each other in such a gas-tight manner that a change in gas pressure in the furnace can be permanently maintained in the range of +10 Pa to −40 Pa in relation to the surrounding air pressure.

The individual steps of inserting the carbon bodies into the graphitization furnace until they are removed from the graphitization furnace are as follows:

insertion of the impregnated carbon bodies into a Castner-type graphitization furnace;

heating of the impregnated carbon bodies in one furnace life with an adjustable temperature program from ambient temperature to the usual (re-)baking temperatures of 800 to 1200° C. up to graphitization temperature;

collection and removal of the cracked gases that develop thereby at an excess gas pressure or low gas pressure of +10 Pa to −40 Pa in relation to the surrounding air pressure under a covering over the Castner-type graphitization furnace;

cooling of the graphitized carbon bodies thus formed; and removal of the latter from the carbonization furnace.

The cracked gases that develop when the impregnated carbon bodies are heated were dealt with in the discussion of the prior art. It was shown that the quantity of cracked gases that develop is dependent upon the heating-up rate of the impregnated carbon bodies.

Another important variable is the absolute quantity of impregnated carbon bodies in the furnace. If an Acheson furnace is compared with a Castner-type furnace, given the same spacing of the furnace ends, it can be specified as a rule of thumb that an Acheson furnace can receive approximately two to three times the quantity of carbon bodies as a Castner-type furnace. This means, with respect to the quantity of pitch that is introduced into the furnace with the carbon bodies, that a fully occupied Castner-type furnace contains only approximately one half to one third of the quantity of pitch as an Acheson furnace. This is to be regarded as being favorable for the quantity of cracked gases that develop during one furnace life of the furnace in accordance with the invention. The type of pitch only influences the quantity of cracked gases that develop to a slight extent, since the pitch composition of the impregnating pitches does not vary very much. The two variables "heating-up rate" and "absolute pitch quantity in the furnace" are critical for the volumes of cracked gases that develop during the furnace life per unit of time. The removal of these volumes depends upon the construction and the operation of the furnace.

As long as the covering hood on the Castner-type graphitization furnace is in use, inter alia the gas pressure is regulated throughout the furnace with the aid of a suction-removal configuration. Compared with the surrounding air pressure, an excess gas pressure of up to +10 Pa or a low gas pressure of down to −40 Pa, preferably +5 Pa to −25 Pa, prevails in the furnace. Even with an excess gas pressure of 10 Pa, the furnace is tight to a sufficient extent in technical terms so that it does not give off any smoke or vapors towards the outside. The gas pressures change in the course of a furnace life as a function of the chemical and physical processes in the furnace. The impregnating pitch carbonizes preferably in the temperature range of approximately 400 to approximately 700° C. and at the same time cracked gases develop. While passing through this temperature range, the largest quantities of cracked gas develop; the furnace is operated with slight excess pressure (up to a maximum of +10 Pa, preferably up to 5 Pa) in this period of time.

As described, the cracked gases are composed of an extraordinarily broad spectrum of hydrocarbon compounds. In accordance with their molecular weight and the other properties, these hydrocarbon compounds have very different condensation and evaporation temperatures. Under the conditions of the Castner-type graphitization furnace, these compounds come into different temperature zones. Close to the central hot core of pitch-impregnated carbon bodies, many compounds are present there just in a gaseous form. The gas pressure does, however, drive the compounds into the thermal insulation of coke grains that surrounds the carbon bodies. Starting from the hot core of the furnace, the temperature decreases towards the outer edge of the insulation. Constituents of the cracked gases now condense in these cooler parts of the insulation.

Since the temperature distribution in the furnace, and specifically in the insulation, is not static, the substances which have condensed in the first instance in the cooler sections do not remain at these points. In the course of the furnace life, the temperature rises in the furnace in general and in the insulation in the first instance, but later decreases again. The wave of high temperatures migrates outwards in the insulation and reaches the substances that have condensed in the sections of the insulation that are cooler first. These substances evaporate anew. In this way, the coke packing emits gas over a comparatively long time span. For this reason, the suction-removal for the whole furnace remains further in operation for up to 24 hours after the maximum temperature has been reached in the furnace core and after the current-flow through the carbon bodies has then subsequently been switched off.

The cracked gases are combustible. Combustible gases produce ignitable explosive gas mixtures when mixed with oxygen with an oxygen content of over five percent by volume. The oxygen content of the furnace atmosphere is therefore monitored by suitable sensors. The oxygen content is regulated in two ways in order to prevent too great a rise: either inertia-producing gases are fed into the furnace atmosphere or else the low pressure is reduced by suction-removal and thus less infiltrated air is drawn into the furnace until less than four percent by volume oxygen can be detected in the furnace atmosphere.

At the beginning of the furnace life, the oxygen content in the furnace and under the covering is identical with that of the ambient air, that is, it lies at approximately 21% by volume. With the rise in the temperatures in the furnace core, the first combustible cracked gases start to develop there. In order to prevent ignitable gas mixtures from developing precisely during the beginning of the furnace life, gases that produce inertia during this phase, such as, for example, nitrogen and carbon dioxide, are flushed into the furnace. Sensors are used to monitor whether the oxygen content remains below 4% by volume at the beginning of the furnace life as well.

Although the invention is illustrated and described herein as embodied in a method, a furnace shell, and a furnace for rebaking and graphitizing carbon bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
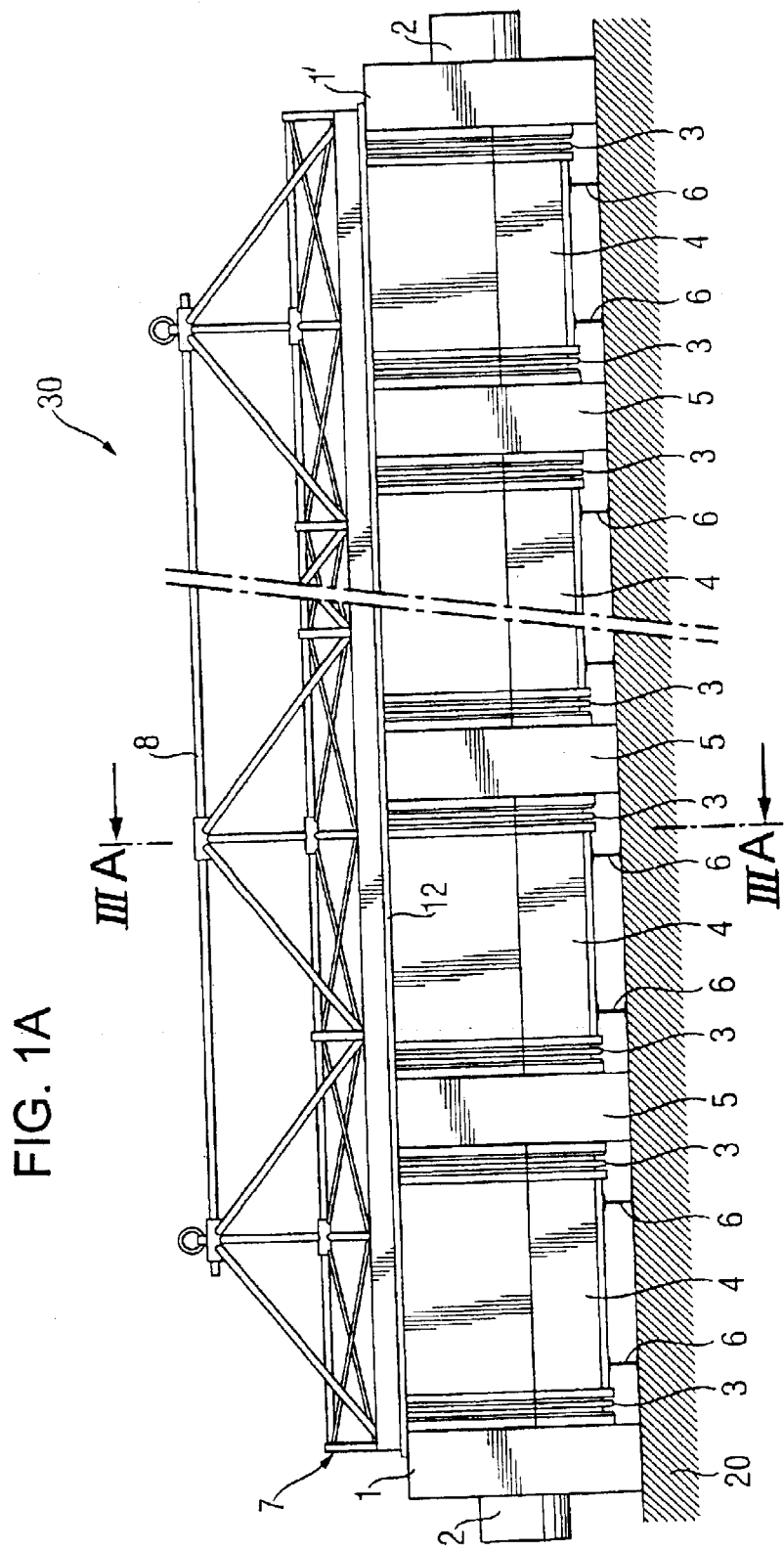
FIG. 1A is a diagrammatic side view showing a furnace according to the invention.

Referring now to the figures of the drawings in detail and first, particularly to FIG. 1A thereof, there is shown a furnace shell that is subdivided along the length of a furnace 30 and which stands on a hall floor 20. The furnace 30 starts on the left-hand side with the furnace end 1 through which a contact electrode 2 passes. Following on from the furnace end 1, there is a compensator 3 of steel sheet that can compensate for the changes in length of the furnace during a furnace life parallel to its longitudinal axis. The compensator 3 is connected to the furnace end 1, on the one side, and to the steel-sheet element 4, on the other side, in a fixed and gas-tight manner in accordance with the demands made on the whole furnace 30. The steel-sheet element portion 4 is held by carriers 6. Following on from the first steel-sheet element section 4 there is a further compensator 3. A concrete rib 5 follows. The assembly, compensator 3, steel-sheet element 4, compensator 3 and concrete rib 5, is repeated along the length of the furnace several times. The furnace is sealed off on the right-hand side of FIG. 1A by a second furnace end 1' with a contact electrode 2. The furnace bears, over the whole of its length, a covering 7 that is held by a framework of struts 8. The covering 7 can easily be removed as a whole with the aid of a crane.

Figure 1B:
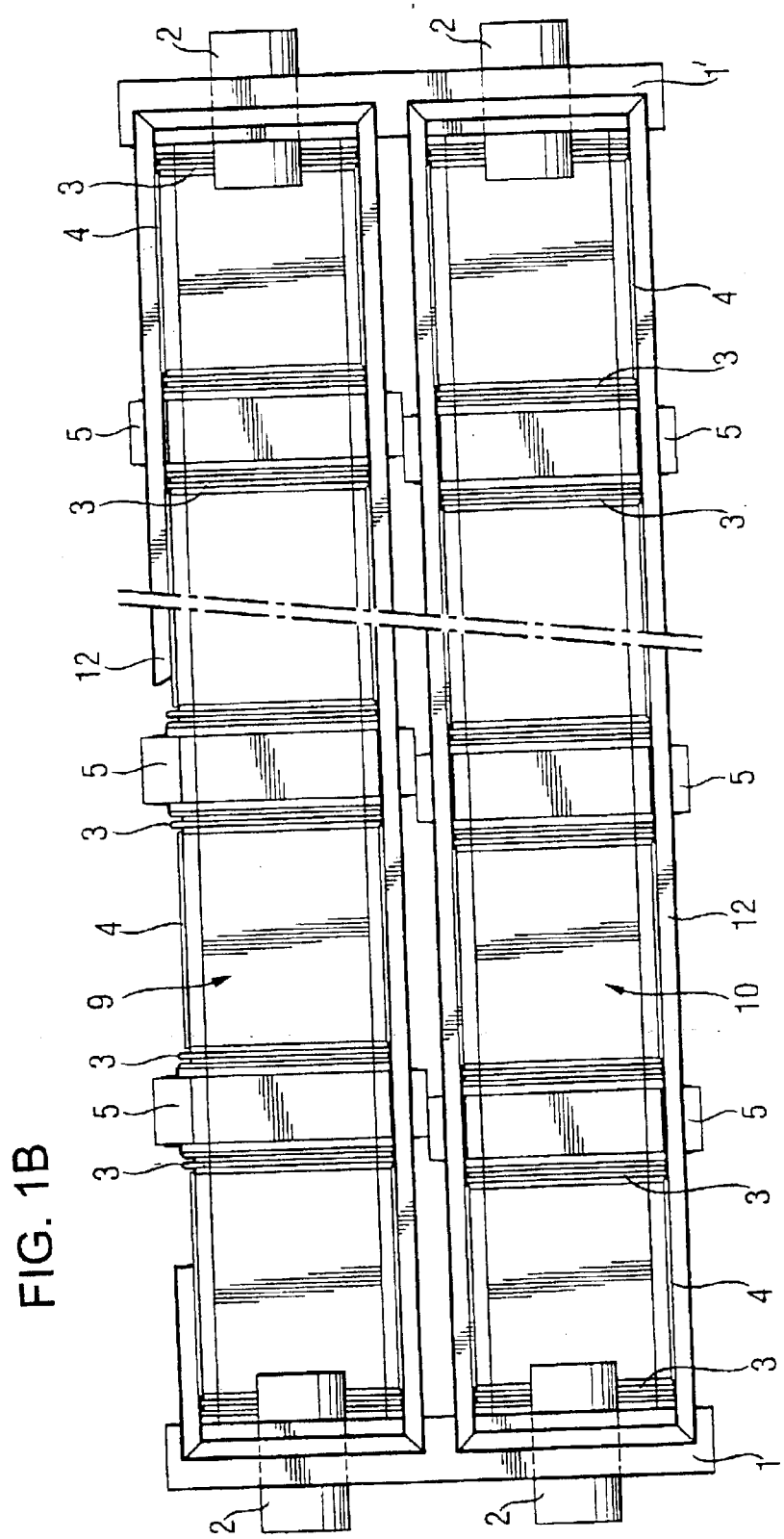
FIG. 1B is a plan view showing the furnace from FIG. 1A.

FIG. 1B shows the plan view of the furnace without the covering 7. Two furnace shells 9 and 10 that are close together and each of which is composed of a plurality of assemblies, compensator 3, steel-sheet element 4, compensator 3 and concrete rib 5, can be seen. Both furnace shells end on the left and on the right at the furnace ends 1 and 1'. The contact electrodes 2, which project into the interior space of the furnace, are drawn in a diagrammatic manner here.

Figure 2:
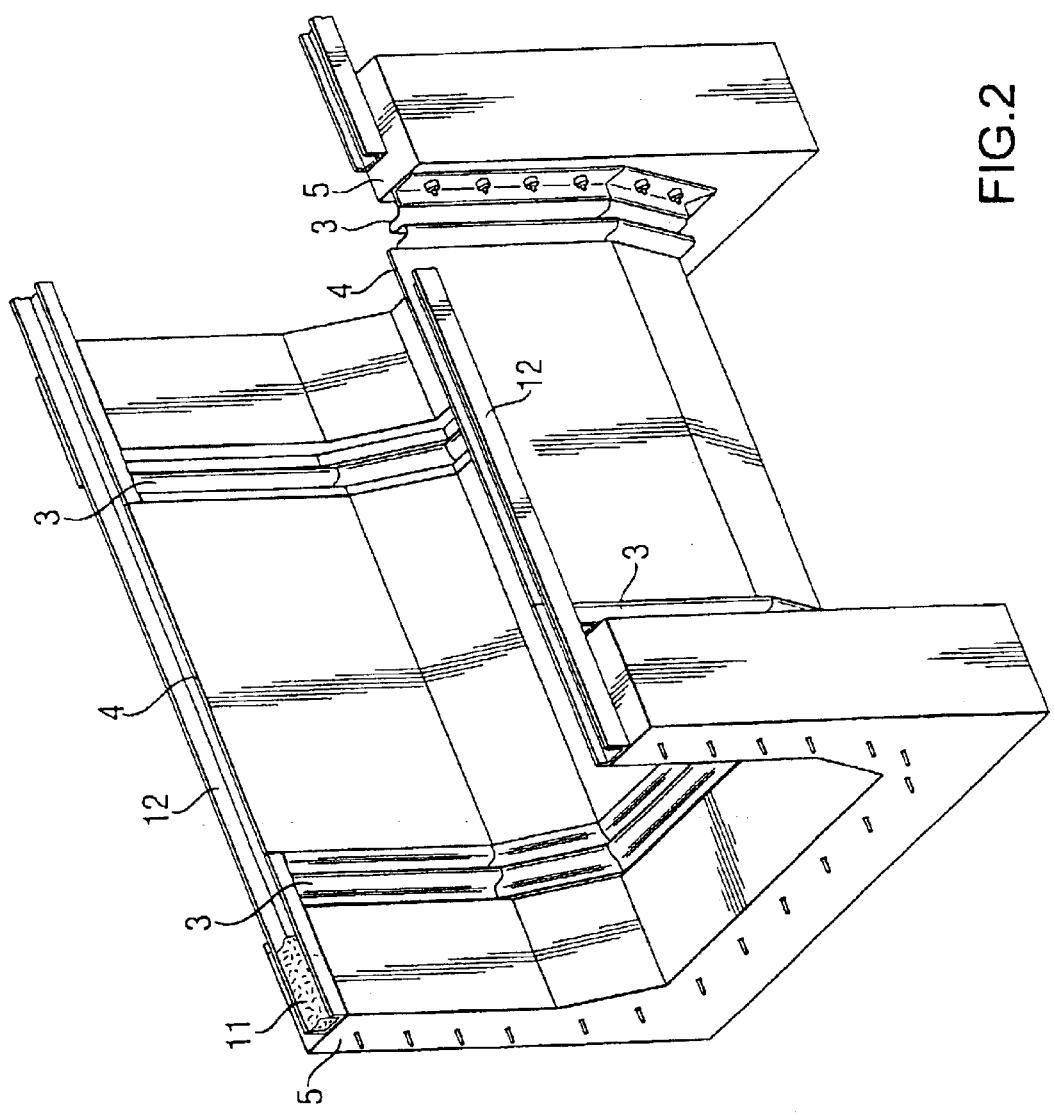
FIG. 2 is a perspective view of a shell portion of the furnace from FIG. 1A.

FIG. 2 shows a three-dimensional drawing of an assembly including a concrete rib 5, a compensator 3, a steel-sheet element 4, a compensator 3 and a concrete rib 5. The upper shell edge 12 is drawn so that it is shown in an interrupted or non-continuous manner.

Figure 3A:
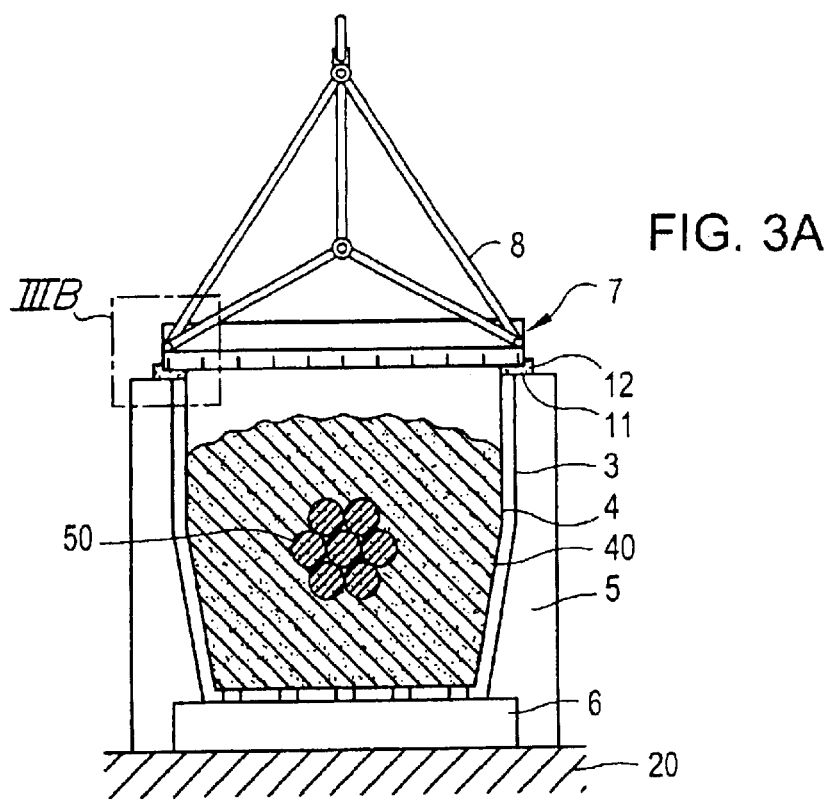
FIG. 3A is a sectional view taken along line IIIA—IIIA of FIG. 1A, in the direction of the arrows, through an assembly of an upper shell edge, mineral wool, and a lower edge of the covering.
Figure 3B:
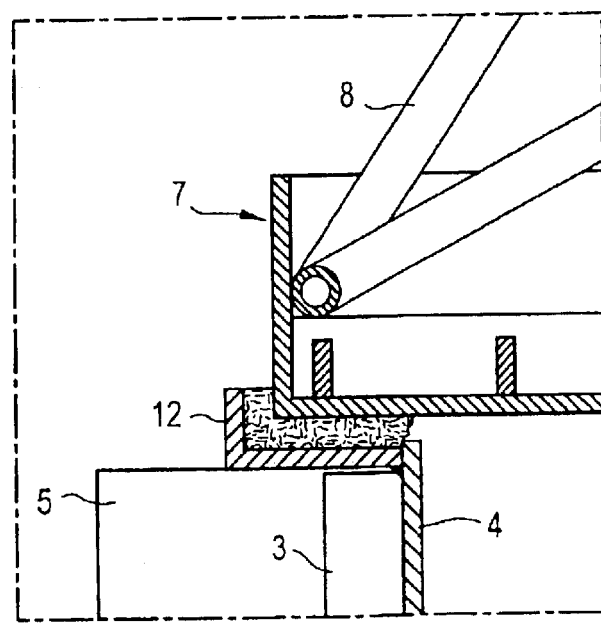
FIG. 3B is an enlarged partial view showing a detail IIIB from FIG. 3A.

A section along IIIA—IIIA from FIG. 1A is shown in FIG. 3A transversely through a furnace bed or transversely through a steel-sheet element 4 and the covering 7 located thereon with the bearing framework 8. A thermal insulating layer 40 of coke packing material surrounds the impregnated carbon bodies 50 on all sides. FIG. 3B shows an enlarged detail portion from FIG. 3A. Mineral wool 11 is laid on the widened upper shell edge 12 of the steel-sheet element 4. The covering 7 loads the mineral wool 11 with its weight, compresses the mineral wool 11 and thus seals the furnace towards the top to a sufficient extent in technical terms.

We claim:

1. A method for rebaking and graphitizing carbon bodies impregnated with pitch in one method step, the method which comprises:

installing the carbon bodies in a Castner-type lengthwise graphitization furnace having a shell and current-supplying and current-returning electrodes;

forming a column by aligning the carbon bodies between the current-supplying and current-returning electrodes;

surrounding the impregnated carbon bodies on all sides by a thermal insulating layer of coke packing material;

enclosing the thermal insulating layer embracing the carbon bodies within the surface by closing a gas-tight covering on the shell in a gas-tight manner and thereby defining a furnace atmosphere and an external air pressure surrounding the furnace;

before heating the carbon bodies, lowering an oxygen content in the furnace atmosphere to less than 4% by volume;

conducting an electrical current through the column of the carbon bodies according to a predetermined program to heat the column of the carbon bodies in one furnace life through a rebaking stage of the impregnating pitch to reach ultimately a graphitization temperature;

regulating a gas pressure inside the graphitization furnace to limit deviation between +10 Pa and −40 Pa relative to the external air pressure by at least in part removing gases and vapors escaping the carbon bodies and the insulating layer from the furnace with a suction device;

interrupting the electrical current after the graphitization temperature has been reached; and removing the thus rebaked and graphitized carbon bodies after cooling the insulating packing until the gases and vapors cease to emerge therefrom and then opening the furnace.

2. The method according to claim 1, which further comprises lowering the oxygen content in the furnace atmosphere before the heating step by flushing the furnace atmosphere with a gas selected from the group consisting of carbon dioxide and nitrogen.

3. The method according to claim 1, which further comprises keeping the oxygen content in the furnace atmosphere below four percent by volume by admixing a non-combustible gas with a mixture oxygen content below one percent by volume.

4. The method according to claim 1, which further comprises adjusting the gas pressure inside the furnace relative to the external air pressure surrounding the furnace by regulating one of a quantity of gas to be removed by suction or a temperature course.

5. The method according to claim 1, which further comprises adjusting the gas pressure inside the furnace relative to the external air pressure surrounding the furnace by regulating a quantity of gas to be removed by suction and a temperature course.

6. The method according to claim 1, which further comprises regulating the gas pressure inside the furnace to limit a deviation from +5 Pa to −25 Pa relative to the external air pressure surrounding the furnace.

7. The method according to claim 1, which further comprises:

maintaining the covering on the furnace for a period of up to a further 24 hours from when the electrical current is interrupted; and during the period of up to a further 24 hours, maintaining the regulating of the gas pressure inside the furnace.

8. A furnace shell to be sealed in a gas-tight manner and used in a Castner-type lengthwise graphitization furnace, the furnace shell comprising:

two furnace ends delimiting an interior space, made of ceramic material, being gas-tight, having electrodes for conducting an electrical current, and defining a longitudinal axis therebetween;

a steel-sheet element and a concrete rib connected together and to each of said furnace ends in a detachable, but gas-tight manner and following each other alternatingly;

said steel-sheet element having shell walls and a planar shell base connecting said shell walls, together defining an inside contour, and being disposed longitudinally to define two longitudinal ends;

a carrier disposed on said lower side of said shell base and adapted for resting on a hall floor;

compensators made from corrugated sheet steel and each connected in a gas-tight and fixed manner at a respective one of said longitudinal ends of said steel-sheet element;

said concrete rib being adapted for standing on the hall floor and having an inside contour matching the inside contour of the steel-sheet element; and said steel-sheet element and said concrete rib having an upper edge having a groove formed therein for receiving a covering hood;

mineral wool filling said groove and to be compressed by the covering hood upon lower edges of a covering hood engaging said grooves to create a sufficiently gas-tight seal.

9. A lengthwise graphitization furnace, comprising:

a furnace shell according to claim 8; and a covering hood having a lower edge for resting on said upper shell edge in a sealed yet removable manner, said covering hood sealing off an interior space when resting on said upper shell edge.

10. The furnace shell according to claim 9, wherein said concrete rib is heat-resistant and electrically insulating.

* * * * *